United States Patent

[11] 3,627,091

[72] Inventors Fred J. Fleischauer
Oakmont, Pa.;
Theodore A. Hammond, Grand Haven, Mich.
[21] Appl. No. 842,046
[22] Filed May 5, 1969
[45] Patented Dec. 14, 1971
[73] Assignees General Logistics Corporation
Oakmont, Pa.
by said Fleischauer;
Ermanco Incorporated
Grand Haven, Mich., by said Hammond

[54] GRAVITY ROLLER CONVEYOR WITH PULSATING BAND BRAKE
4 Claims, 2 Drawing Figs.
[52] U.S. Cl.......................................... 193/35 A
[51] Int. Cl..........................................B65g 13/00, B65g 13/075
[50] Field of Search............................ 193/35 A, 35–37; 198/160, 161, 127

[56] References Cited
UNITED STATES PATENTS
| 1,406,709 | 2/1922 | Wilson | 193/35 A |
| 1,900,150 | 3/1933 | Anderson | 193/35 A |
| 2,194,219 | 3/1940 | Eggleston | 193/35 A |
| 2,979,177 | 4/1961 | Sullivan | 193/35 A |
| 2,929,177 | 4/1961 | Sullivan | 193/35 A |

FOREIGN PATENTS
| 32,217 | 10/1933 | Netherlands | 193/35 |
| 1,189,916 | 8/1962 | Germany | 198/127 |

Primary Examiner—Evon C. Blunk
Assistant Examiner—W. Scott Carson
Attorney—Wolfe, Hubbard, Voit, Leydig & Osann ABSTRACT: A braking device for gravity roller conveyors is disclosed in which a flexible band is disposed against certain conveyor rollers to apply a self-energizing frictional braking force upon being tensioned by a powered cyclical tensioner for tensioning and releasing the band at predetermined periodical intervals.

Patented Dec. 14, 1971
3,627,091
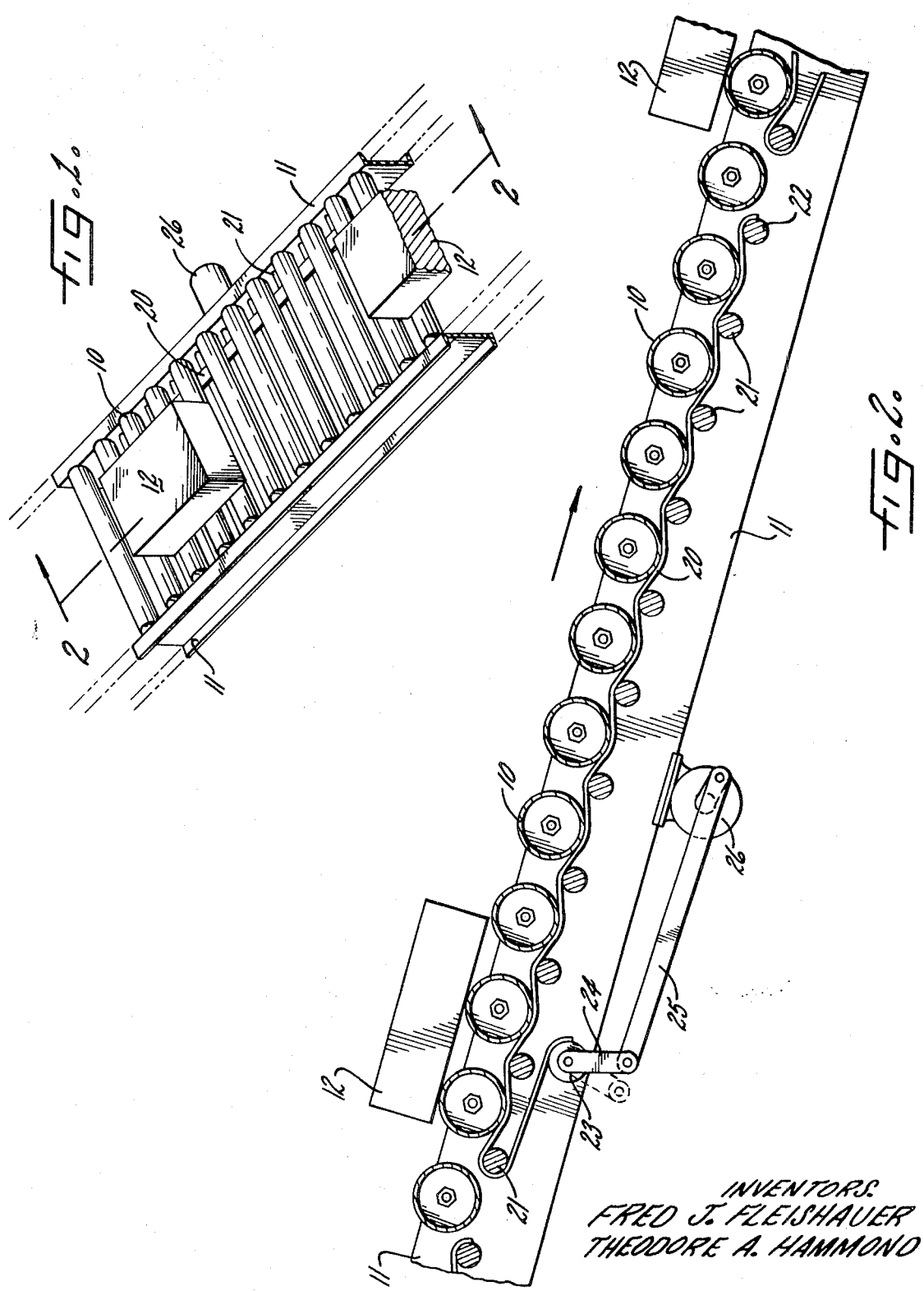
INVENTORS.
FRED J. FLEISHAUER
THEODORE A. HAMMOND
BY
Wolfe, Hubbard, Voit & Osann
ATTORNEYS.

GRAVITY ROLLER CONVEYOR WITH PULSATING BAND BRAKE

DESCRIPTION OF THE INVENTION

This invention relates to roller conveyors for conveying individual objects by gravity along a declining pass line. In its principal aspect the invention concerns a pulsating self-energizing brake which is effective to regulate the speed of conveyed objects to prevent excessive speed and overrun.

A principal object of the present invention is to provide a braking system for gravity roller conveyors which is effective to slow or stop the movement of individual conveyed objects in a manner to achieve a relatively uniform rate of descent for objects of varying size and weight. In particular, it is intended to provide a braking means for such conveyors which is self-energizing in a manner which imparts an increased frictional braking effect to descending objects of greater size and weight, with the kinetic energy of the braked object being transformed into increased braking effect and consequent deceleration.

Other objects and advantages of the invention will become apparent from reading the following detailed description in conjunction with the drawings, in which:

FIG. 1 is a partial perspective of a gravity roller conveyor exemplifying the present invention; and FIG. 2 is a side elevation of the conveyor of FIG. 1.

While the invention is described in connection with a particular preferred embodiment, it will be understood that the invention is not restricted to the particular uses and applications shown and described herein, but on the contrary may be used in all gravity conveyor applications wherein precisely controlled and proportional braking effect is required to assure proper operation.

Turning to the drawings, there is pivoted in FIG. 1 an exemplary gravity conveyor in which individual transverse rollers 10 are supported by longitudinal side members 11 for rotation. The upper surfaces of the individual rollers 10 are disposed on a common declining plane at an acute angle to the horizontal, defining a pass line along which conveyed objects are carried. They may also be located in a horizontal section at the end of a declining conveyor section. The rollers 10 are each individually pivoted on the side members 11 and are not powered in any way except by the movement of conveyed packages 12 passing down the conveyor line.

Pursuant to the invention, means are provided to arrest or brake certain rollers or groups of rollers along the conveyor path in response to a periodic triggering signal. Conveyed objects are then slowed or stopped during each periodic interval so that they cannot acquire an excessive velocity which might result in overrunning or damage when the packages reach the end of the conveyor. The objects 12 are thereby controllably allowed to descend the conveyor and under many conditions may be kept spaced and prevented from jamming together.

To accomplish this objective, an elongated flexible member or brake band 20 is disposed adjacent certain rollers or associated groups of rollers 10 in a manner which arrests the movement of these rollers when tension is applied to one end of the band. In the exemplary embodiment, the band 20 is disposed beneath each roller 10 to be braked. The band 20 is positioned adjacent each associated roller 10 by a pair of support pegs 21 on each side of the roller 10. At one end, the band is anchored to an anchor peg 22. From the anchor peg 22 the band is disposed in serpentine fashion between the rollers 10 and the support pegs 21 so that when tensioned, the band 20 will wrap against the periphery of each roller 10 at a predetermined angle of band wrap as shown in FIG. 2. In this example, the opposite end of the band 20 is looped around the support peg 21 most upstream with respect to descending conveyor movement, and then disposed downstream to a point where it is connected to a tensioning means.

The tensioning means includes a tensioning roller 23 having a lever arm 24 attached to a crank arm 25. A motor 26 reciprocates the crank arm 25 causing the lever arm 24 and tensioning roller 23 to reciprocate over a limited angle of movement, thereby alternately tensioning and releasing the upstream end of the band 20.

It is a feature of the invention that the band 20 is disposed in a manner which provides a self-energizing effect when it is tensioned. It will be observed that the anchor peg 22 is positioned to resist the frictional forces induced in the band by the rotation of the rollers 10 as a descending package 12 passes by. The downward forces of gravity and momentum in a conveyed object 12 will tend to rotate the individual rollers 10 in a clockwise direction as seen in FIG. 2, causing each roller to pull the band 20 upstream against the fixed anchor peg 22. The braking force generated by the first roller upstream the anchor peg 22 tends to pull the band away from the anchor peg 22 and the next roller 10 upstream up adds to this frictional force while the package 12 is still in contact, and tends to draw the band 20 more tightly against the preceding roller. This effect is additive as more rollers are added to the group associated with a single band 20, and the presence of additional conveyed packages 12 upon that group of rollers increases the braking effect still further. The braking force applied to each roller thus increases in a downstream direction in the particular group of rollers with which it is associated with the roller 10 closest to the anchor peg 22 receiving the greatest amount of frictional braking effect. Since this roller would normally be associated with the fastest moving package 12, or with the package having the greatest amount of accumulated pressure behind it due to the force of following packages, the braking effect is thereby applied where it is most required.

The amount of initial tension applied to the band 20 by the cyclical tensioning device may be easily varied by adjusting the length of the crank arm 25 or the mounting position of the motor 26 on the side member 11 to which it is attached. Desirably, the band 20 is alternately tensioned and then completely released to allow the rollers 10 to rotate freely under the weight of a descending package 12 until the motor 26 reaches the next tensioning portion in its cycle. The cycle frequency may be varied according to the number of rollers in the conveyor, the angle of descent, and the weight of the packages to be accommodated.

The following is claimed as invention:

1. In conjunction with a conveyor having a frame and a plurality of spaced rollers defining a pass line tangent to the upper surfaces of said rollers and at a declining angle to the horizontal for transporting objects in a declining direction of conveyor movement by gravitational forces, said rollers being rotatable in their normal forward direction by the passage of an object over said rollers, a pulsating brake comprising, in combination an elongated flexible member disposed adjacent the periphery of certain of said rollers, positioning means disposed below said pass line for supporting the member at a predetermined angle of wrap against the adjacent periphery of each of said certain rollers, means securing one end of said member against movement relative to said rollers an independent motor means, and means operated by said motor means for applying a pulsating tension force to said member whereby a pulsating braking force is applied to said certain rollers.

2. Apparatus as defined in claim 1 in which said flexible member is positioned adjacent the underside of said certain rollers and said securing means is an anchor on said conveyor frame positioned downstream of said certain rollers to which said one end of the member is fixed whereby during the periods said member is tensioned by said motor operated pulsating tensioning means further forward rotational movement of any of said certain rollers causes additional tensioning of said member and a self-energizing additional braking force on said certain rollers.

3. The combination according to claim 2 wherein said pulsating tensioning means tensions said elongated member in the direction of movement of said adjacent roller periphery.

4. A conveyor comprising a frame, a plurality of rollers spacedly and rotatably mounted on said frame defining a pass line tangent to the upper surfaces of said rollers and at a declining angle to the horizontal for transporting objects in a declining direction of conveyor movement by gravitational forces, said rollers being rotatable in their normal direction by the passage of an object over said rollers, a pulsating brake comprising an elongated flexible member disposed adjacent the periphery of at least some of said rollers, a plurality of support members arranged in an alternating array with said some rollers for supporting said elongated member, said supports having an upper extremity below said pass line and above the lower extremity of said some rollers so as to define a serpentine configuration of said elongated member and define a predetermined angle of wrap of said member against the adjacent periphery of each of said some rollers, means securing one end of said member against movement relative to said rollers, a reciprocatably mounted element to which the other end of said member is secured, and an independent motor means for reciprocating said element in a direction and at a predetermined rate for applying a pulsating tension force to said member whereby a pulsating braking force is applied to said some rollers.

* * * * *

PO-1050
(5/69)

UNITED STATES PATENT OFFICE
CERTIFICATE OF CORRECTION

Patent No. 3,627,091          Dated December 14, 1971

Inventor(s) Fred J. Fleischauer and Theodore A. Hammond

It is certified that error appears in the above-identified patent and that said Letters Patent are hereby corrected as shown below:

Column 1, line 35, delete --pivoted-- and insert "shown".

Column 3, line 4, after "normal" insert "forward".

Signed and sealed this 22nd day of August 1972.

(SEAL)
Attest:

EDWARD M.FLETCHER,JR.      ROBERT GOTTSCHALK
Attesting Officer            Commissioner of Patents